Feb. 16, 1926.
M. S. MASTRUKOFF
UNIVERSAL ART CAMERA
Filed May 5, 1925
1,572,899
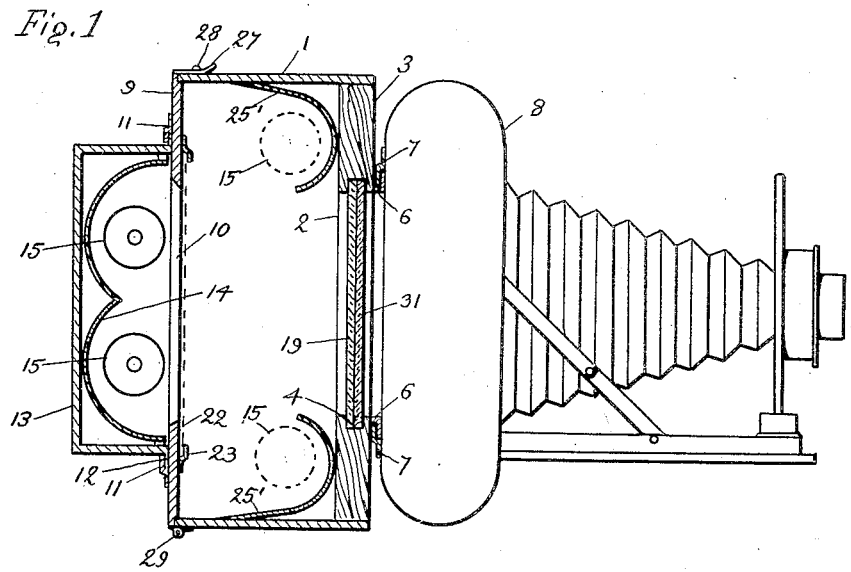
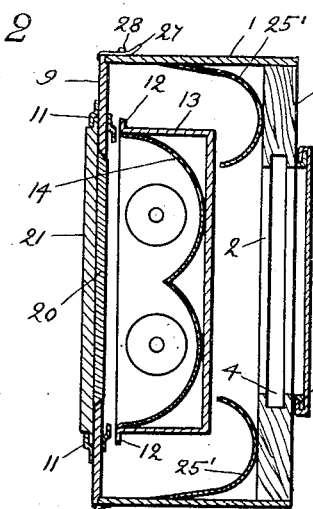
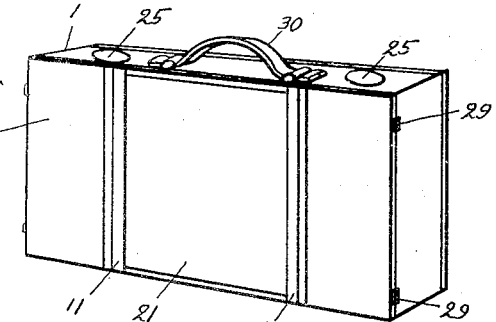
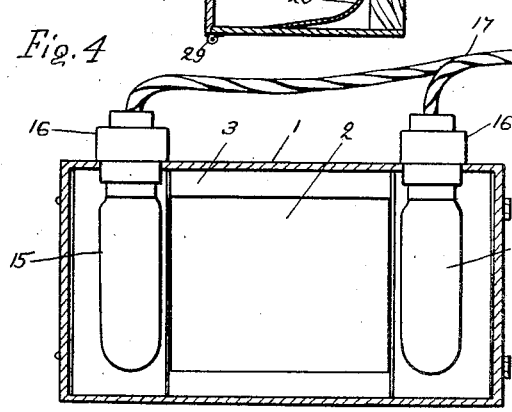
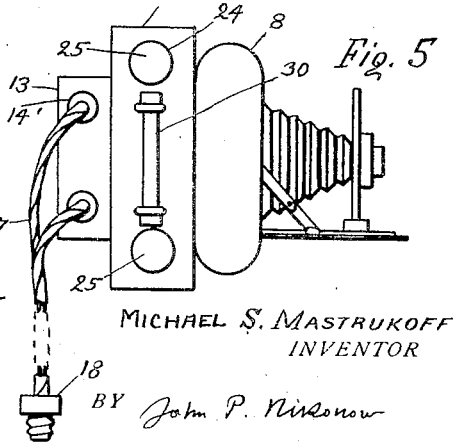
MICHAEL S. MASTRUKOFF
INVENTOR
BY John P. Nixonow
ATTORNEY Patented Feb. 16, 1926.

1,572,899

UNITED STATES PATENT OFFICE.

MICHAEL S. MASTRUKOFF, OF NEW YORK, N. Y.

UNIVERSAL ART CAMERA.

Application filed May 5, 1925. Serial No. 28,153.

*To all whom it may concern:*

Be it known that I, MICHAEL S. MASTRU-KOFF, a citizen of Russia, and resident of New York, in the county of New York and State of New York, have invented certain new and useful Improvements in Universal Art Cameras, of which the following is a specification.

My invention relates to universal art cameras and has a particular reference to cameras adapted for enlarging photographic and other pictures.

The object of my invention is to provide a camera adapted to be used in conjunction with an ordinary photographic camera, such as a kodak etc., for the purpose of projecting images of pictures through the camera lenses onto a screen. Such images may be then directly reproduced by placing a sheet of photographic sensitive paper on the screen, or by drawing the outline of the projected picture.

For this purpose I provide my camera with a source of a strong light, such as electric lamps, and direct the light from these lamps through a photographic negative plate placed at the rear of the photographic camera with the rear cover removed and my camera attached instead.

I have also provision in my camera for projecting images from ordinary pictures of photographs, placed at the rear of my camera and using reflected light from the lamps.

While the art of enlarging pictures is not new, my apparatus possesses important novel features in that it does not require any special projecting lenses and fixtures, but is adapted to form a part of any ordinary suitable photographic camera, and can be folded into a small portable box. At the same time it is universal in a sense that it can be used for enlarging negatives and pictures.

My invention is more fully described in the accompanying specification and drawing in which—

Fig. 1 is a sectional elevation of my camera in a working position and attached to a photographic camera, Fig. 2 is a sectional plan view of my camera in an inoperative position, folded and closed, Fig. 3 is a perspective outside view of my camera in a closed position, Fig. 4 is a sectional rear view with the electric lamps, and Fig. 5 is an elevation of the camera in an operative position.

My camera consists of a case or main camera 1 with an aperture 2 in the front wall 3. This aperture has inner slots 4 for inserting negatives 5. The wall 3 is provided with hooks or catches 6 adapted to engage corresponding catches 7 of an ordinary camera 8. The catches 7 may be specially provided for this purpose, or the camera 1 may be adapted to be attached to the rear of the camera 8 by replacing the rear cover of the camera 8. In this case the hooks 6 are made to fit the rear aperture in the camera 8 taking place of its cover (not shown).

The rear wall 9 of the camera 1 is provided with an aperture 10 and has slots or hooks 11 on the outside adapted to engage the flanged edges 12 of a rear camera 13. This camera is provided with reflecting mirrors 14 and has apertures 14' in the side wall for electric lamps 15 and adapted to fit their sockets 16. A piece of lamp cord 17 with a plug 18 may be used to connect the lamps with any suitable lighting circuit.

The operation of my device is as follows.

The rear cover of the photographic camera 8 is removed and my camera 1 is attached instead with a negative 19 inserted in the slot 4. The rear or illuminating camera 13 is then attached to the rear of the camera 1 and the lamps 15 connected with the lighting circuit. The photographic camera 8 is then fully opened and directed against a screen. The enlarged image of a picture of the negative 19 will then appear on the screen and may be drawn over or reproduced on a sensitive photographic paper. A ground glass plate 31 may be also used.

Fig. 5 shows my camera in such position.

My camera can be also used for reproducing enlarged pictures from photographs. In this case the aperture 10 is closed with a cover 20 fitting tight into tapered edges of the aperture and pressed in with an outside cover 21 which fits with its edges into grooves or catches 11, as shown in Fig. 2. A photograph or picture 22 (shown with dotted lines in Fig. 1) is placed against the rear cover 9 and is held with hooks or catches 23. The lamps 15 are placed in apertures 24 after the plugs 25, covering these apertures, have been removed. The light from the lamps is reflected from mirrors 25 onto the picture 22, and the reflected image of the picture is directed through the camera 8 onto a screen to be reproduced on a photographic paper (the screen mentioned is not shown). The camera 1 serves as a reflecting chamber.

When not in use, the camera 1 may be detached from the photographic camera 8 and the aperture 2 closed with a cover 26 with its edges fitting into grooves 6. The illuminating chamber 13 is detached from the cover 9, and the covers 20 and 21 placed in their positions, as shown in Fig. 2. The latch 27 is lifted from a pin 28 and the cover 9 swung open. The chamber 13 is then placed with the lamps inside of the reflecting chamber 1, and the cover 9 closed again (it may be connected to the chamber 1 by means of hinges 29), plugs 25 replaced, and the whole device becomes closed into a compact package as shown in Fig. 3.

I have found that with my art camera of a comparatively small size, for instance, 2½x4½x8½ inches, when closed, very good enlargements can be made from small snapshots of about 2x2 or less, enlarging them to about 10x10, enlargement being successful in sizes from 4 to 8 times of the original. Any ordinary kodak may be used of a suitable size.

The ratio indicated may differ widely, however, depending on the kind of lamps used, also on the quality of the original pictures, and I have also obtained good enlargements in sizes of 14x17 and 14x21.

Important advantages of my art camera are, that it can be used in conjunction with any suitable ordinary photographic camera, is very simple and compact, can be folded into a small portable package, can be used with negatives and with positive pictures of any kind and size, and is cheap to manufacture.

A handle 30 may be used for convenience in carrying my camera when folded.

I claim as my invention:

1. In an universal art camera, the combination with a chamber, the front wall of said chamber being provided with an aperture and adapted to be detachably connected to an ordinary photographic camera taking place of a rear cover of said camera, means to support a negative of a picture in said aperture, lamps on the side of said chamber, reflectors for said lamps, said lamps and said reflectors being placed so as not to obstruct said aperture, but adapted to throw the light on the rear wall of said chamber, detachable connections between said rear wall and said chamber, said rear wall being provided with an aperture, means to support a picture against said rear wall, a second chamber attached to said rear wall, and means to support said lamps in said second chamber in front of said aperture in said rear wall.

2. In an universal art camera, the combination with a chamber, the front wall of said chamber being provided with an aperture and adapted to be detachably connected to an ordinary photographic camera replacing the rear cover of said photographic camera, means to support transparent pictures in said aperture, means to support non transparent pictures against the rear wall of said chamber, said rear wall being provided with an aperture, a second chamber detachably connected to said rear wall from the outside, electric lamps, and means to support said lamps inside of said second chamber in front of said aperture in the rear wall, or inside of said first chamber on the sides of said aperture in said front wall.

3. In an universal art camera, the combination with a chamber, the front wall of said chamber being provided with an aperture and adapted to be detachably connected to an ordinary photographic camera taking place of its rear cover, means to support transparent pictures in said aperture, means to support opaque pictures against the rear wall of said chamber, said rear wall being provided with an aperture, a second chamber detachably connected to said rear wall on the outside, electric lamps, supporting means for said lamps inside of said first chamber and inside of said second chamber, said second chamber with said lamps being adapted to be placed in an inoperative position inside of said first chamber, and covers for all of said apertures when said chamber is detached from said photographic camera and is placed in an inoperative position.

Signed at New York, in the county of New York and State of New York, April A. D. 1925.

MICHAEL S. MASTRUKOFF.